United States Patent
Svensson et al.

(10) Patent No.: US 10,666,088 B2
(45) Date of Patent: May 26, 2020

(54) INDUCTIVE ELEMENT PROTECTION IN A POWER SUPPLY SYSTEM

(71) Applicant: ABB Schweiz AG, Baden (CH)

(72) Inventors: Jan Svensson, Västerås (SE); Kalle Ilves, Västerås (SE); Minos Beniakar, Västerås (SE); Theodore Soong, Toronto (CA); Nick Elliott, Havelock North (NZ)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/472,354

(22) PCT Filed: Dec. 6, 2017

(86) PCT No.: PCT/EP2017/081699
§ 371 (c)(1),
(2) Date: Jun. 21, 2019

(87) PCT Pub. No.: WO2018/114338
PCT Pub. Date: Jun. 28, 2018

(65) Prior Publication Data
US 2019/0363572 A1  Nov. 28, 2019

(30) Foreign Application Priority Data
Dec. 23, 2016 (EP) .................... 16206543

(51) Int. Cl.
*H01F 29/02* (2006.01)
*H02H 9/04* (2006.01)
*H02J 9/06* (2006.01)

(52) U.S. Cl.
CPC .............. *H02J 9/061* (2013.01); *H01F 29/02* (2013.01); *H02H 9/04* (2013.01)

(58) Field of Classification Search
CPC ........... H02J 9/061; H01F 29/02; H02H 9/04; H02H 7/055; H02H 9/005; H02H 9/042; H02H 7/04
See application file for complete search history.

(56) References Cited

U.S. PATENT DOCUMENTS 5,388,021 A * 2/1995 Stahl ................. H02H 9/005
361/104
5,532,897 A * 7/1996 Carpenter, Jr. ........ H02H 9/044
361/111

(Continued)

FOREIGN PATENT DOCUMENTS

CN 101064288 A 10/2007
CN 201178305 Y 1/2009

(Continued)

OTHER PUBLICATIONS

European Search Report Application No. EP 16 20 6543 Completed: Jun. 9, 2017; dated Jun. 23, 2017 7 pages.

(Continued)

*Primary Examiner* — Jared Fureman
*Assistant Examiner* — Michael J Warmflash
(74) *Attorney, Agent, or Firm* — Whitmyer IP Group LLC (57) ABSTRACT

A protection arrangement for an uninterruptible power supply system including at least one vacuum circuit breaker connected in series with an inductive element, the protection arrangement including a first bypass branch and a first grounding branch, the first bypass branch being connected in parallel with the inductive element and including two series-connected protective components of a first type and a bypass branch midpoint between them, where the first grounding branch is connected between the bypass branch midpoint and ground and includes a first grounding surge arrester.

17 Claims, 4 Drawing Sheets (56) References Cited

U.S. PATENT DOCUMENTS

| | | | |
|---|---|---|---|
| 2009/0154034 A1 | 6/2009 | Tallam | |
| 2011/0279943 A1* | 11/2011 | Penwell | H01P 1/20 361/118 |
| 2013/0321959 A1 | 12/2013 | Ranstad et al. | |
| 2014/0340807 A1 | 11/2014 | Kularatna et al. | |
| 2016/0087431 A1 | 3/2016 | Krumpholz | |
| 2016/0149396 A1 | 5/2016 | Lindell et al. | |

FOREIGN PATENT DOCUMENTS

| | | |
|---|---|---|
| EP | 3023998 A1 | 5/2016 |
| JP | H07322486 A | 12/1995 |
| JP | H09103066 A | 4/1997 |
| JP | 2001061238 A | 3/2001 |
| JP | 2007060826 A | 3/2007 |
| JP | 2007281479 A | 10/2007 |
| KR | 20120097359 A | 9/2012 |
| WO | 2015007621 A1 | 1/2015 |

OTHER PUBLICATIONS

International Preliminary Report on Patentability Application No. PCT/EP2017/081699 Completed: Dec. 5, 2018; dated Dec. 5, 2018 12 pages.

International Search Report and Written Opinion of the International Searching Authority Application No. PCT/EP2017/081699 Completed: Feb. 8, 2018; dated Mar. 14, 2018 13 pages.

Nepsi Northeast Power Systems, Inc. "MV-TVSS Medium Voltage Transient Surge Suppressor", Bulletin:800-00, Rev. Sep. 24, 2015 4 Pages.

Chinese Office Action Application No. 2017800794563 Completed: Oct. 9, 2019 2 Pages.

Japanese Office Action Application No. 2019-534252 Completed: Nov. 5, 2019 2 Pages.

* cited by examiner

INDUCTIVE ELEMENT PROTECTION IN A POWER SUPPLY SYSTEM

TECHNICAL FIELD

The present invention generally relates to power supply systems. More particularly the present invention relates to a voltage source converter, a method of controlling the voltage source converter and a computer program product for such a voltage source converter.

BACKGROUND

Uninterruptible power supply (UPS) systems may be used for supplying power to various loads such as data centers. Such a system may then comprise a number of parallel UPS branches connected between a ring bus and a power supply cable connected to a power distribution system or grid. Each such branch may furthermore comprise an UPS module and supply power to a corresponding load, where an UPS module may comprise series-connected magnetically coupled reactors separated by a tap point and an auxiliary power supply connected to the tap point. An UPS unit may thus be based on an autotransformer. In such a system it is also possible that various entities are interconnected using cables.

In relation to such a power supply a fault may occur in the ring bus, in a load, in the power supply cable, or even in the grid. In order to isolate the fault from the rest of the power supply system, one or more circuit breakers may also be provided and these circuit breakers may be vacuum circuit breakers.

However, if the circuit breaker is a vacuum circuit breaker, then the opening of it may lead to high transient voltages at the various inductive elements of the power supply system, such as at reactors between cable sections and the above-described autotransformer of the UPS module. One or more of these inductive elements may therefore need to be protected from such overvoltages caused by the operation of such vacuum circuit breakers.

A commonly used type of protective component is a surge arrester. Surge arresters are for instance known to be used for protecting transformers, such as dry type transformers, see for instance EP 3023998 and US 2016/0149396.

However, surge arresters have also been known to be used in other environments. US 2013/0321959 does for instance disclose a power supply converter unit where surge arresters are connected between phases as well as between phase and ground before and after an inductor in order to protect the inductor.

U.S. Pat. No. 5,388,021 discloses a power supply connected to a load via a circuit breaker and an inductor. Surge arresters are connected to ground on both sides of the inductor. There is also a surge arrester connected in parallel with the inductor.

KR 2012 0097359 discloses a power saver for a lamp. A power supply is connected to a load via a capacitor in parallel with a reactor. There is also a surge absorber connected between the reactor and ground.

US 2011/279943 discloses a surge suppressor device with an input connected to an output via a capacitor in parallel with two inductors. There is also a gas tube connected between one end of the parallel connection and ground, which gas tube may be replaced by a metal oxide varistor.

U.S. Pat. No. 5,532,897 discloses a surge suppression system for a high voltage substation, where two surge arresters are connected on opposite sides of a reactor. There is also a resistor connected in parallel with the reactor. Faults which are disconnected through vacuum circuit breakers may not only occur on the supply side of the inductive element but also on the load side. It would therefore be of interest to protect an inductive element of a power supply system against overvoltages that may occur on both sides of the inductive element.

SUMMARY

The present invention is directed towards protecting an inductive element of a power supply system from overvoltages caused by a vacuum circuit breaker that may appear on both sides of an inductive element together with protection across the inductive element.

This object is according to a first aspect of the present invention achieved through a protection arrangement for an uninterruptible power supply system comprising at least one vacuum circuit breaker connected in series with an inductive element, the protection arrangement comprising a first bypass branch and a first grounding branch, the first bypass branch being connected in parallel with the inductive element and comprising at least one protective bypass component and the first grounding branch being connected between the first bypass branch and ground and comprising a first grounding surge arrester, wherein the first bypass branch comprises two series-connected protective components of a first type and a bypass branch midpoint between them, where the first grounding branch is connected between said bypass branch midpoint and ground.

This object is according to a second aspect of the invention achieved through an uninterruptible power supply system comprising at least one vacuum circuit breaker connected in series with an inductive element as well as a protection arrangement according to the first aspect.

The present invention has a number of advantages. It provides protection against overvoltages caused by a vacuum circuit breaker across as well as on both sides of the inductive element. The protection being offered is therefore versatile.

BRIEF DESCRIPTION OF THE DRAWINGS

The present invention will in the following be described with reference being made to the accompanying drawings, where FIG. 1 schematically shows a power supply system comprising a number of uninterruptible power supply branches connected between a power supply cable and a ring bus, FIG. 2 schematically shows the power supply system when there is a fault in the ring bus, FIG. 3 schematically shows the power supply system when there is a fault in a load connected to one uninterruptible power supply branch, FIG. 4 schematically shows a part of the power supply system of FIG. 1 realized as four cable sections of the UPS system separated by circuit breakers and a reactor when there is a fault on one side of the power supply system part, FIG. 5 schematically shows the power supply system part when there is a fault on the other side of the same, FIG. 6 schematically shows the power supply system part with two surge arresters connected to ground on each side of the reactor, FIG. 7 schematically shows the power supply system part together with a first variation of a protection arrangement that is useful for understanding the invention, FIG. 8 schematically shows the power supply system part together with a second variation of a protection arrangement that is useful for understanding the invention, FIG. 9 schematically shows the power supply system part together with a third variation of a protection arrangement that is useful for understanding the invention, FIG. 10 schematically shows the power supply system part together with a protection arrangement according to a first embodiment of the invention, FIG. 11 schematically shows the power supply system part together with a protection arrangement according to a second embodiment of the invention, FIG. 12 schematically shows the power supply system part together with a protection arrangement according to a third embodiment of the invention, FIG. 13 schematically shows another part of the power supply system from FIG. 1 where an autotransformer is equipped with a protection arrangement according to the first embodiment of the invention, FIG. 14 schematically shows the other power supply system part together with a protection arrangement according to the second embodiment of the invention, and FIG. 15 schematically shows the other power supply system part together with a protection arrangement according to the third embodiment of the invention.

DETAILED DESCRIPTION

In the following, a detailed description of various protection arrangements will be given.

Figure 1:
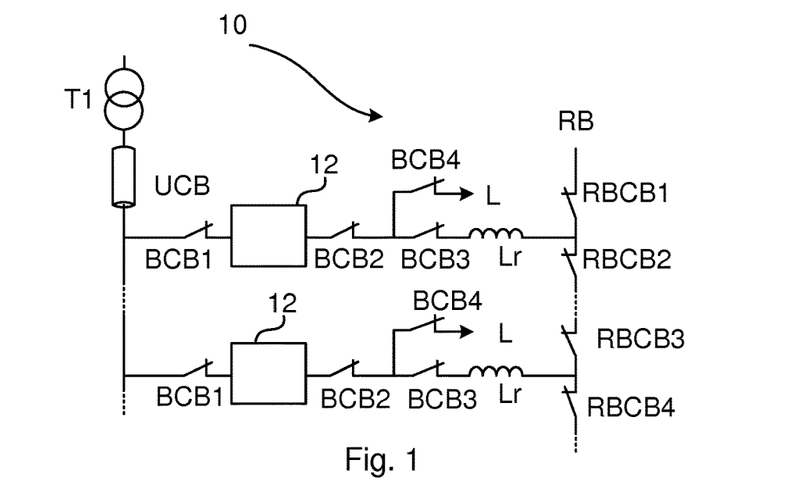

FIG. 1 schematically shows a power supply system 10 in order to provide power to a number of different loads L, which may as an example be various loads of a data center such as servers and cooling equipment. The power supply system 10 is with advantage a medium voltage (MV) uninterruptible power supply (UPS) system and receives power, for instance from a power distribution system or grid (not shown), via a first transformer T1. The first transformer T1 is in turn connected to a supply cable UCB which may also be termed an upstream cable, since loads are placed downstream from this upstream cable UCB. A number of loads L may be connected to this cable and such loads may be connected to the upstream cable UCB via a number of parallel UPS branches.

The upstream cable UCB may as an example provide a medium voltage such as 11 kV.

Each UPS branch may also be connected to a ring-bus RB through a reactor Lr, where the ring bus RB may also be realized using a cable. In the considered system, vacuum circuit breakers are installed for disconnecting various faults. The vacuum circuit breakers may be provided in the ring bus RB as well as in the UPS branch.

As an example such a branch may comprise an UPS module 12 having a first side connected to the upstream cable via a first branch circuit breaker BCB1. A second side of the UPS module 12 is connected to a second branch circuit breaker BCB2, which in turn is connected to the ring bus RB via a third branch circuit breaker BCB3 in series with a reactor Lr. The second branch circuit breaker BCB2 is also connected to a load L via a fourth branch circuit breaker BCB4. Parts of an UPS branch may also be realized using a cable. All of the branch circuit breakers BCB1, BCB2, BCB3, BCB4 may be vacuum circuit breakers.

In the UPS system there may be several such branches connected in parallel between the upstream cable UCB and the ring bus RB. However, in FIG. 1 only two branches are shown.

Furthermore each UPS branch is connected into the ring bus RB via two circuit breakers, where a first ring bus circuit breaker RBCB1 may be connected to the ring bus RB in a first ring bus direction and a second ring bus circuit breaker RBCB2 may be connected to the ring bus RB in a second ring bus direction, the second ring bus direction being opposite to the first ring bus direction. As two UPS branches are shown in FIG. 1, there are thus four ring bus circuit breakers, where an upper UPS branch is connected to a ring bus cable section in the first ring bus direction via a first ring bus circuit breaker RBCB1 and in the second ring bus direction via a second ring bus circuit breaker RBCB2, while a lower UPS branch is connected to the ring bus cable section in the first ring bus direction via a third ring bus circuit breaker RBCB3 and in the second ring bus direction via a fourth ring bus circuit breaker RBCB4. Also all of the ring bus circuit breakers may be vacuum circuit breakers.

As will become evident later on, an UPS module 12 may be realized using an inductive element comprising two series-connected magnetically coupled reactors separated by a tap point, where the magnetically coupled reactors may be formed as a so-called autotransformer. The tap point may furthermore be connected to an auxiliary power supply, perhaps via a transformer.

Faults, such as ground faults, may occur in the system disclosed above. The different types of faults that could occur in the system could have different effects regarding overvoltages across different inductive elements such as at an autotransformer of the UPS module or at a reactor Lr interconnecting cables.

In the considered power supply system, vacuum circuit breakers are used for disconnecting various faults.

It is for instance possible that the upstream cable UCB may not be able to supply the power necessary for the various loads. It may as an example not be able to supply any or only insufficient power. This may be due to the fact that there is a fault either in the upstream cable UCB, the first transformer T1 or in the power distribution system or power grid. If such a situation occurs it may be necessary to disconnect the branches with the UPS module 12 from the cable UCB, which disconnection is typically made by using the first branch circuit breaker BCB1.

However it is also possible that a fault occurs in the ring bus or in a load.

Figure 2:
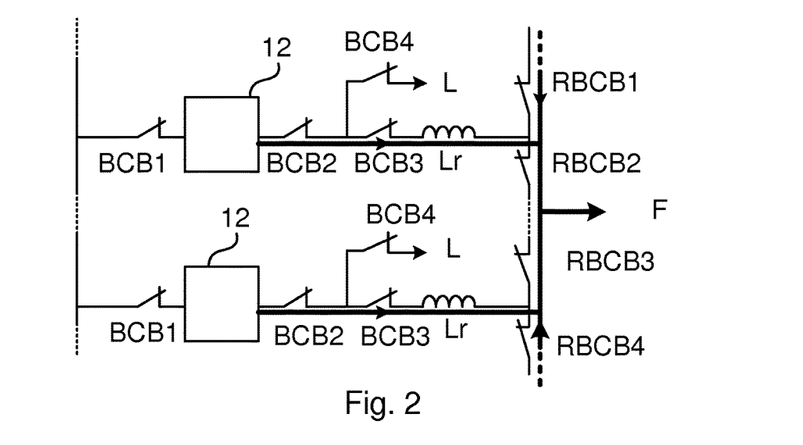

For example, a fault F can occur at the ring bus RB as illustrated in FIG. 2. FIG. 2 schematically shows the two UPS branches connected to the ring bus RB. Here it can be seen that a fault current flows from both the UPS modules 12 of the two UPS branches through the second and third branch circuit breakers BCBR2 and BCBR3 via the second and third ring bus circuit breaker RBCB2 and RBCB3 to the fault F, which occurs in a cable section between the second and third ring bus circuit breakers RBCB2 and RBCB3. Fault currents are also running in both directions of the ring bus RB to the fault.

Figure 3:
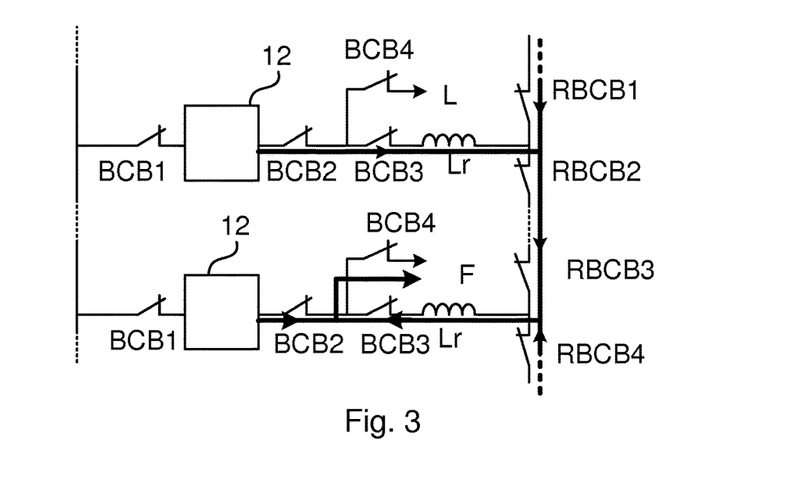

A fault can also occur on the load connected to one of the UPS branches. FIG. 3 schematically shows the two UPS branches and the ring bus RB for such a fault F in the load of the lower UPS branch. Here it can be seen that a fault current flows within the lower UPS branch from the UPS module 12 to the fault F via the second and fourth branch circuit breakers BCB2 and BCB4. A fault current also runs from the UPS module 12 of the upper UPS branch via the second and third branch circuit breakers BCB2 and BCB3 of this upper UPS branch and via the second and third ring bus circuit breakers RBCB2 and RBCB3 into the lower UPS branch and then further via the reactor Lr and the third and fourth branch circuit breakers BCB3 BCB4 of the lower UPS branch to the fault F.

It can be seen in FIGS. 2 and 3 that fault currents may run in both directions through the reactor Lr of the lower UPS branch.

Figure 4:
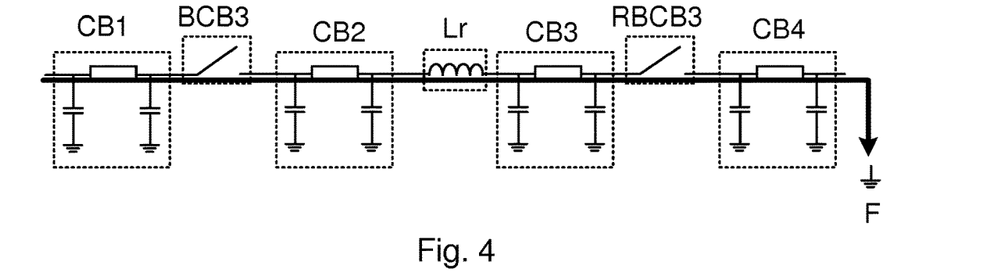
Figure 5:
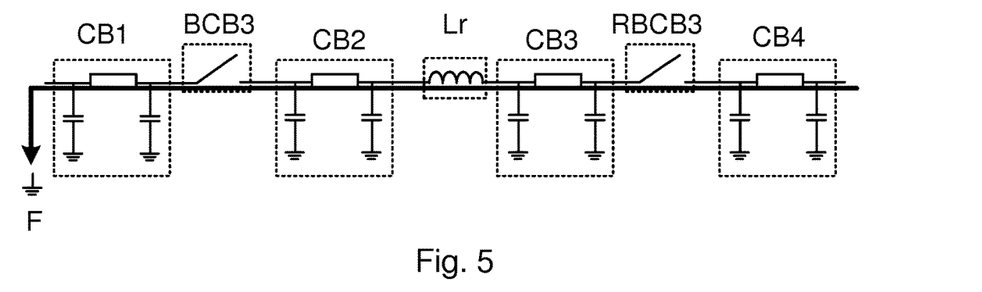

The two scenarios are illustrated in FIGS. 4 and 5 for a more generalized UPS system with regard to fault current running through an inductive element, exemplified by the reactor Lr, interconnecting different sections of the UPS system, which sections may be different cable sections.

FIGS. 4 and 5 show a part of the UPS system that stretches from a point between the second and third branch circuit breakers BCBR2 and BCBR3 of the lower UPS branch to a point between the second and third ring bus circuit breakers RBCB2 and RBCB3 of the ring bus RB. It can be seen that this part of the UPS system comprises a number of interconnected cable sections. In this case there are four cable sections, a first cable section CB1, a second cable section CB2, a third cable section CB3 and a fourth cable section CB4. Each cable section is here also shown as having a series resistance with a first end connected to ground via a first capacitance and a second end connected to ground via a second capacitance. The capacitances are typically the stray capacitances of a cable, while the resistance is the resistance formed through the cable resistivity times the length of the cable section.

Moreover, it can be seen that the first and second cable sections CB1 and CB2 are separated by the third branch circuit breaker BCB3 and that the third and fourth cable sections CB3 and CB4 are separated by the third ring bus circuit breaker RBCB3. Finally the second and third cable sections CB2 and CB3 are separated by the reactor Lr. The cable sections CB1, CB2, CB3 and CB4, circuit breakers BCB3, RBCB3 and reactor Lr are thus connected in series with each other. Both circuit breakers BCB3 and RBCB3 are vacuum circuit breakers.

Furthermore, in FIG. 4 it can be seen that there is a fault F on the right side of the fourth cable section CB4 and thereby a fault current runs to the fault F from the first cable section CB1 via the third branch circuit breaker BCB3, the second cable section CB2, the reactor Lr, the third cable section CB3, the third ring bus circuit breaker RBCB3 and the fourth cable section CB4. In this case the third ring bus circuit breaker RBCB3 may be opened in order to separate the reactor Lr from the fault. In FIG. 5 it can be seen that there is a fault F on the left side of the first cable section CB1 and thereby a fault current runs to the fault F from the fourth cable section CB4 via the third ring bus circuit breaker RBCB3, the third cable section CB3, the reactor Lr, the second cable section CB2, the third branch circuit breaker BCB3 and the first cable section CB1. In this case the third branch circuit breaker BCB3 may be opened in order to separate the reactor Lr from the fault.

It can thereby be seen that depending on which circuit breaker is opened, high overvoltages could occur on either side of the reactor Lr, which overvoltages are often due to arc re-ignition occurring in the vacuum circuit breaker. For a system operating at 11 kV it is not uncommon with transient overvoltages being as high as 100 kV.

Since vacuum circuit breakers and cables exist on both sides of each reactor, overvoltages associated with vacuum circuit breakers can occur on both sides of each reactor Lr. There is therefore a need for protecting the inductive element Lr against overvoltages appearing on both sides.

Figure 6:
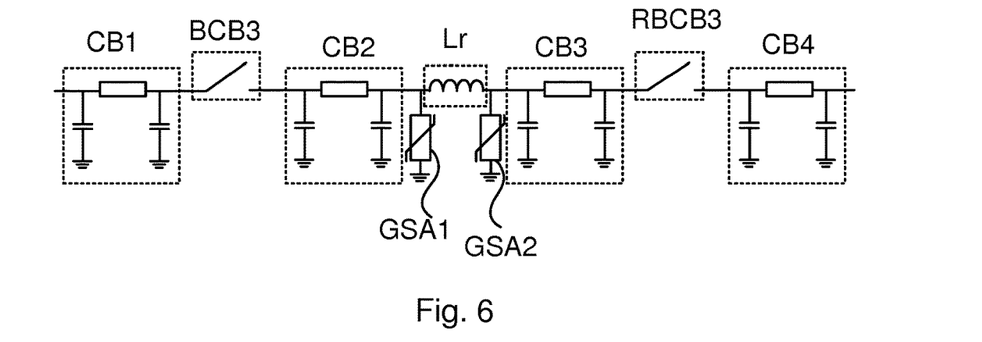

One way of protecting the reactor Lr of the UPS system is shown in FIG. 6. The reactor Lr may be protected through a first grounding branch comprising a first grounding surge arrester GSA1 connected between a first end of the reactor Lr and ground, and through a second grounding branch comprising a second grounding surge arrester GSA2 connected between a second end of the reactor Lr and ground. Surge arresters are thereby placed line-to-neutral on both sides of the reactor Lr in such way that it is protected from overvoltages caused by circuit breaker opening on both sides of the reactor Lr.

In this case, however, the two surge arresters GSA1 and GSA2 appear series-connected for voltages which are induced in the winding that should be protected.

In order to address this and provide protection also across the winding a protection arrangement is proposed that comprises a first bypass branch and the first grounding branch, where the first bypass branch is connected in parallel with the reactor Lr and comprises at least one protective bypass component. The first grounding branch comprising the first grounding surge arrester GSA1 is in turn connected between the first bypass branch and ground. The surge arresters of the protection arrangement may furthermore be metal oxide (MO) surge arresters.

Figure 7:
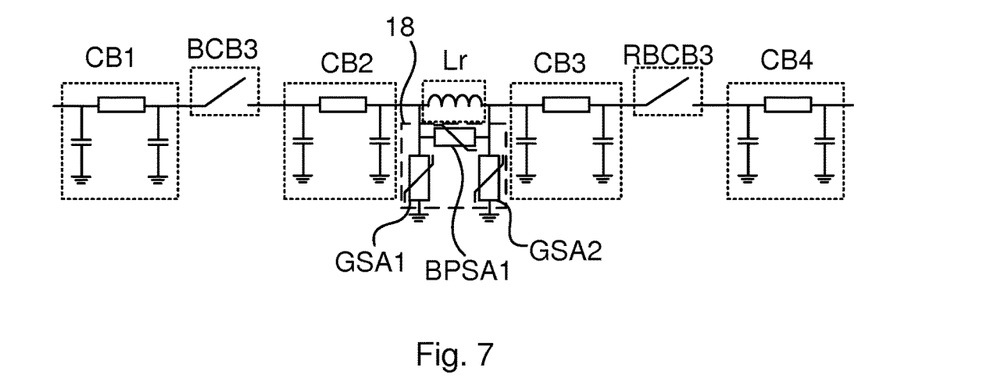

In a first variation of a protection arrangement shown in FIG. 7, the protective bypass component is a first bypass surge arrester BPSA1. Moreover, in this case the first grounding branch with the first grounding surge arrester GSA1 is connected to a first end of the first bypass branch, which first end is also connected to the first end of the reactor Lr. This variation also comprises the second grounding branch with the second grounding surge arrester GSA2 connected to a second end of the first bypass branch and consequently also to the second end of the reactor Lr.

Figure 8:
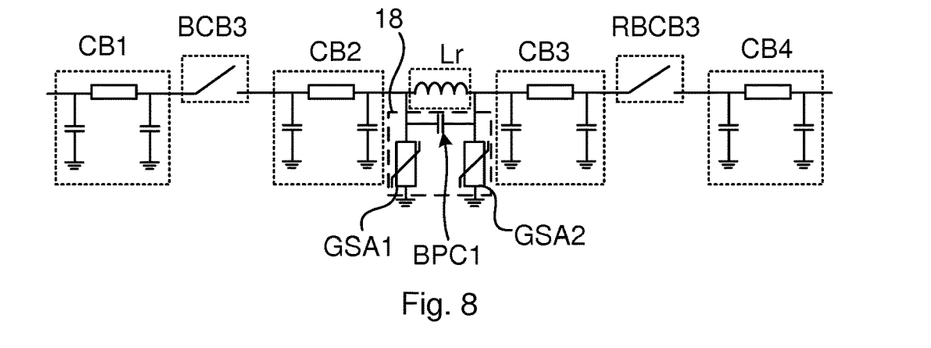
Figure 9:
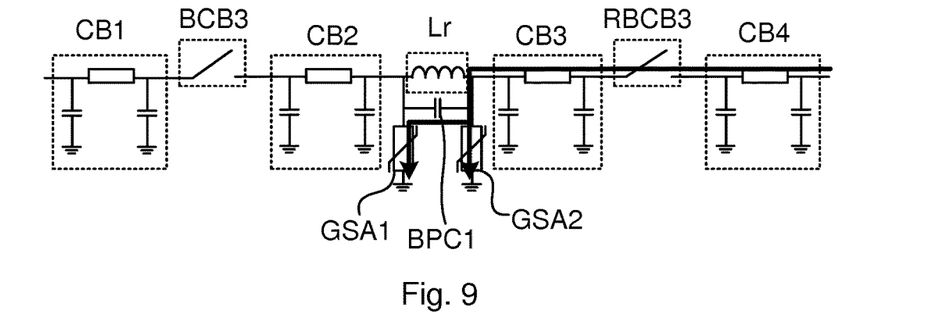

In order to reduce the cost of the surge arresters a first surge capacitor BPC1 could according to a second variation of the protection arrangement be used instead of the first bypass surge arrester in the first bypass branch, as shown in FIG. 8. An additional advantage with this solution is that the two surge arresters connecting each phase to ground appear parallel connected for high-frequency components. This is illustrated in FIG. 9 for a fault current running from the fourth cable section CB4 via the third ring bus circuit breaker RBCB3 and through the third cable section CB3, where it is split into two parts, where one part of the fault current runs to ground via the second grounding surge arrester GSA2 and another part runs to ground via the first bypass capacitor BPC1 and the first grounding surge arrester GSA1.

As another alternative it is possible that the first bypass branch comprises two series-connected protective components of the same type, which type may be a surge arrester or a capacitor. For such a first bypass branch there may be only one grounding branch, the first grounding branch, and this first grounding branch with the first grounding surge arrester GSA1 may be connected to a midpoint of the first bypass branch, where the bypass branch midpoint may be placed between the first and the second protective components. This realization is thus a T-type connection of protective components that protects both the reactor windings from induced voltages and line-to-neutral voltages at both sides.

Figure 10:
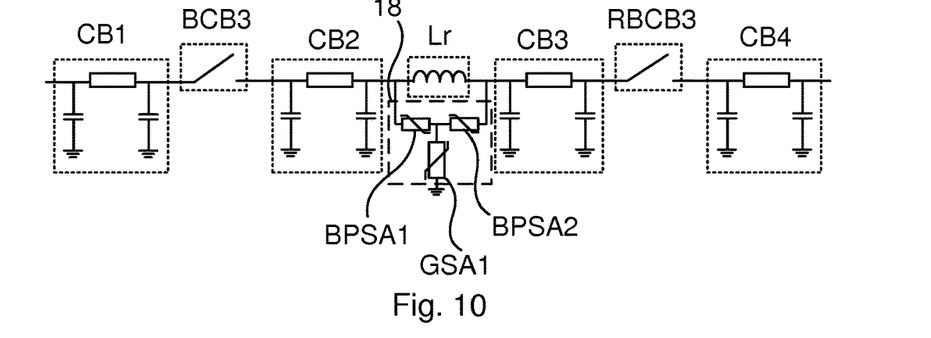

FIG. 10 shows a first embodiment of a protection arrangement according to the invention, where the first and second protective bypass components are a first bypass surge arrester BPSA1 connected in series with a second bypass surge arrester BPSA2 and where, as was stated earlier, the first grounding branch with the first grounding surge arrester GSA1 is connected to the branch midpoint.

In this case each surge arrester need only be rated for ⅔ of the line-to-neutral voltage. The reason for why the rating must be ⅔ and not ½ is that if there is a fault to ground on either side of the reactor Lr, two surge arresters will appear as parallel connected, since the surge arresters appear capacitive when they are not conducting any current. Consequently, ⅔ of the line to neutral voltage will appear across the surge arrester which is connected to the healthy side of the reactor.

Figure 11:
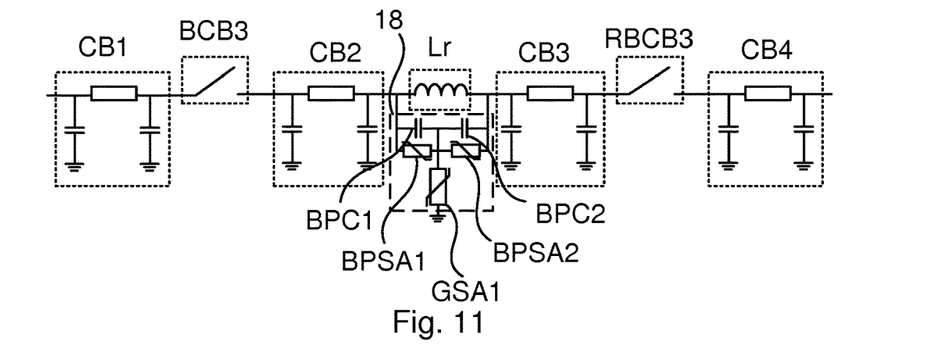

In order to reduce the overrating of the surge arresters, additional surge capacitors can be connected as in FIG. 11, which shows a second embodiment of the protection arrangement 18. In this case there is thus a second bypass branch in parallel with the first bypass branch with a first and a second protective component of another type than in the first bypass branch. The midpoints of the two bypass branches may also be interconnected. In the example of FIG. 11, the first bypass branch comprises the first and second bypass surge arresters BPSA1 and BPSA2 and consequently the second bypass branch has to comprise first and second bypass capacitors BPC1, BPC2 on opposite sides of the branch midpoint.

The capacitive voltage divider that results as a consequence of a line-to-ground fault close to the reactor Lr will then appear as two surge arresters and one capacitor connected to ground in series with one surge arrester and one capacitor connected to the healthy side of the reactor Lr.

Consequently, the difference in capacitance will be reduced compared to the previous case and the voltage sharing will be more even.

Figure 12:
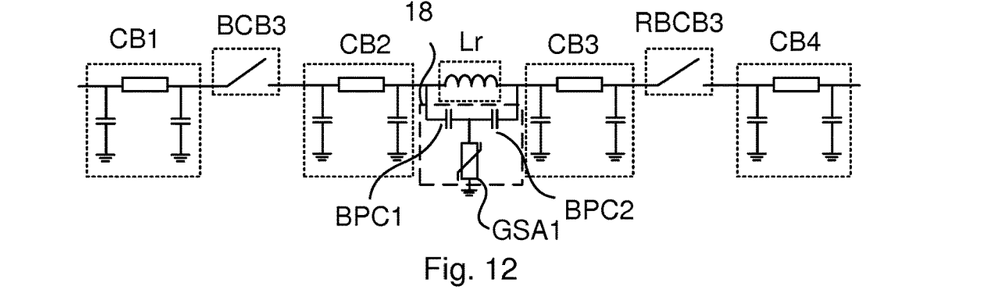

As a further cost reduction, two surge arresters can be replaced by surge capacitors as shown in FIG. 12, which shows a third embodiment of the protection arrangement 18. This means that the first bypass branch comprises the first and the second bypass capacitors BPC1 and BPC2. This will reduce the amount of surge arresters but on the other hand reduce the performance of the resulting overvoltage protection.

As can be seen above, there are a number of ways in which the reactor Lr placed between two cable sections may be protected.

The principles above may also be applied to other inductive elements, such as the inductive elements of the UPS module 12.

Figure 13:
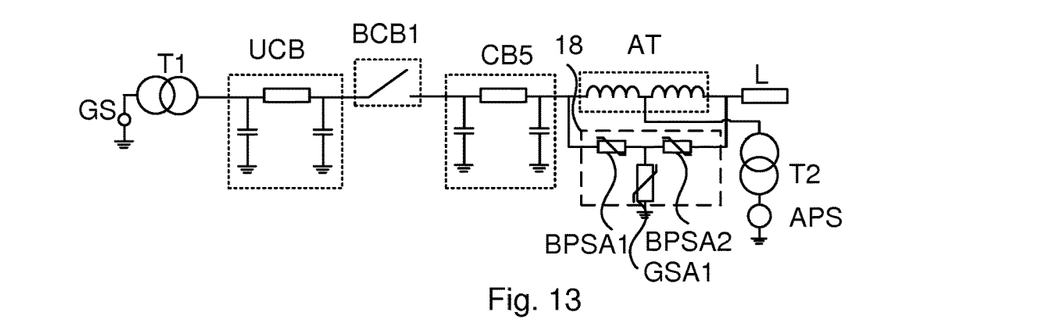

One example of this is shown in FIG. 13, which shows another part of the power supply system from FIG. 1. This other part stretches from the grid to a load connected to an UPS branch, for instance the lower UPS branch. The other part is shown in a similar way as the part depicted in FIG. 4-12. Here there is a grid source GS connected to the first transformer T1, which in turn is connected to a first end of the first branch circuit breaker BCB1 via the upstream cable section UCB, where the second end of the first branch circuit breaker BCB3 is connected to a first end of an inductive element in the form of an autotransformer AT via a fifth cable section CB5, and where the second end of the autotransformer AT is connected to a load L. Compared with FIG. 1, the second, third and fourth branch circuit breakers BCB2, BCB3, BCB4 have been omitted as they are always closed for the fault in question.

Moreover, details of the UPS module are also shown. The UPS module 12 comprises the autotransformer AT with two series-connected magnetically coupled reactors separated by a tap point, which tap point is connected to an auxiliary power source APS and coupling transformer T2. The auxiliary power supply may as an example be operated at 480 V.

In this case there is protection against faults in the upstream cable UCB or grid supply GS, where in case of faults on the grid or upstream cable UCB the first branch circuit breaker BCB1 may be opened and the auxiliary power supply APS be used to supply the load L with power.

As can also be seen in FIG. 13 there is a protection arrangement 18 according to the first embodiment connected in parallel with the autotransformer AT, i.e. in parallel with both the magnetically coupled reactors, where the protection arrangement comprises a first bypass branch comprising first and second bypass surge arresters BPSA1, BPSA2 as well as a first grounding branch comprising the first grounding surge arrester GSA1 connected to the bypass branch midpoint.

Figure 14:
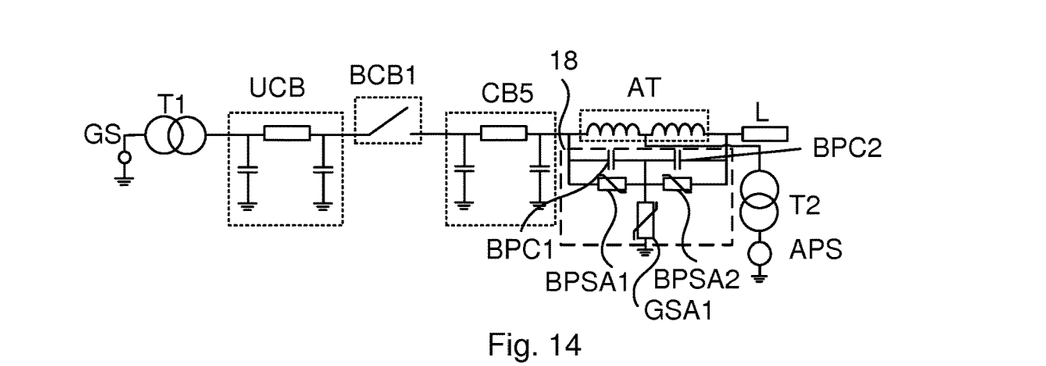

In a similar manner it is possible to also use a protection arrangement 18 according to the second embodiment for the autotransformer, which is shown in FIG. 14. The first bypass branch thus comprises the first and second bypass surge arresters BPSA1 and BPSA2, and the second bypass branch comprises the first and second bypass capacitors BPC1 and BPC2, where the bypass branch midpoints are interconnected and connected to ground via the first grounding surge arrester GSA1.

Figure 15:
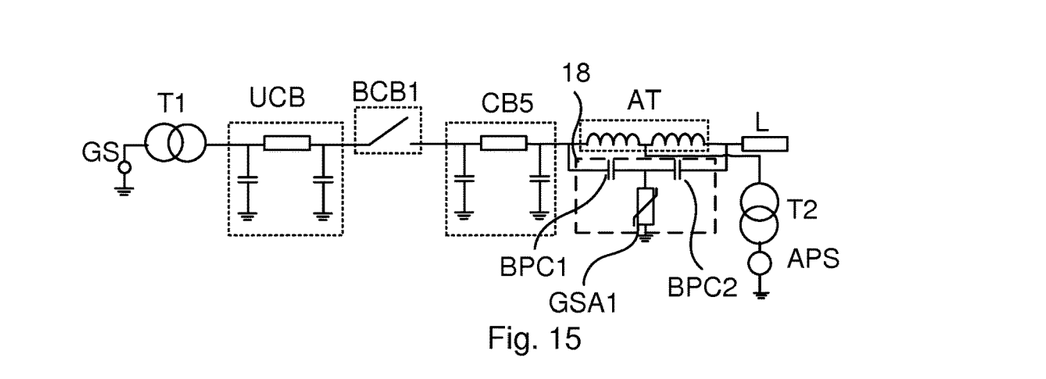

As can be seen in FIG. 15, also the third embodiment is possible to use with the autotransformer AT, where there is only the first bypass branch, now comprising the first and the second bypass capacitors BPC1 and BPC2 with the bypass branch midpoint connected to ground via the first grounding surge arrester GSA1.

From the foregoing discussion it is evident that the present invention can be varied in a multitude of ways. It shall consequently be realized that the present invention is only to be limited by the following claims.

The invention claimed is:

1. An uninterruptible power supply system comprising at least one vacuum circuit breaker connected in series with an inductive element, as well as a protection arrangement, said protection arrangement including a first bypass branch and a first grounding branch, said first bypass branch being connected in parallel with the inductive element and including at least one protective bypass component and said first grounding branch being connected between the first bypass branch and ground and including a first grounding surge arrester,
   wherein the first bypass branch includes two series-connected protective components of a first type and a bypass branch midpoint between them, where the first grounding branch is connected between said bypass branch midpoint and ground and the at least one circuit breaker is a vacuum circuit breaker.

2. The uninterruptible power supply system according to claim 1, wherein the protective components in the first bypass branch are surge arresters.

3. The uninterruptible power supply system according to claim 2, further comprising a second bypass branch connected in parallel with the first bypass branch and including two-series connected protective components of a second type and a bypass branch midpoint interconnected with the bypass branch midpoint of the first bypass branch.

4. The uninterruptible power supply system according to claim 2 further comprising cable sections.

5. The uninterruptible power supply system according to claim 2, wherein the inductive element is a reactor.

6. The uninterruptible power supply system according to claim 2, wherein the inductive element is an autotransformer.

7. The uninterruptible power supply system according to claim 1, wherein the protective components in the first bypass branch are capacitors.

8. The uninterruptible power supply system according to claim 1, further comprising a second bypass branch connected in parallel with the first bypass branch and including two-series connected protective components of a second type and a bypass branch midpoint interconnected with the bypass branch midpoint of the first bypass branch.

9. The uninterruptible power supply system according to claim 8, wherein the protective components in the first bypass branch are surge arresters, and the protective components in the second bypass branch are capacitors.

10. The uninterruptible power supply system according to claim 1 further comprising cable sections.

11. The uninterruptible power supply system according to claim 10, wherein the inductive element is connected between two cable sections and two vacuum circuit breakers.

12. The uninterruptible power supply system according to claim 10, wherein the inductive element is connected between a cable section and a load.

13. The uninterruptible power supply system according to claim 1, wherein the inductive element is a reactor.

14. The uninterruptible power supply system according to claim 1, wherein the inductive element is an autotransformer.

15. The uninterruptible power supply system according to claim 14, wherein the autotransformer includes two series-connected magnetically coupled reactors separated by a tap point.

16. The uninterruptible power supply system according to claim 15, further comprising an auxiliary power source connected to the tap point.

17. The uninterruptible power supply system according to claim 16, further comprising a transformer connected between the tap point and the auxiliary power source.

* * * * *